United States Patent
Hong

(10) Patent No.: US 11,528,712 B2
(45) Date of Patent: *Dec. 13, 2022

(54) METHOD AND APPARATUS FOR CONTROLLING INTERFERENCE FROM CONTROLLABLE DEVICE

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 303 days.

This patent is subject to a terminal disclaimer.

(21) Appl. No.: 16/497,165

(22) PCT Filed: Jul. 24, 2017

(86) PCT No.: PCT/CN2017/094119
§ 371 (c)(1),
(2) Date: Sep. 24, 2019

(87) PCT Pub. No.: WO2019/018985
PCT Pub. Date: Jan. 31, 2019

(65) Prior Publication Data
US 2021/0127390 A1    Apr. 29, 2021

(51) Int. Cl.
*H04B 17/336* (2015.01)
*H04B 17/345* (2015.01)
(Continued)

(52) U.S. Cl.
CPC ........ *H04W 72/082* (2013.01); *H04B 17/336* (2015.01); *H04B 17/345* (2015.01);
(Continued)

(58) Field of Classification Search
CPC ... H04B 7/02–12; H04B 17/0082–3913; H04J 11/0023–0093;
(Continued)

(56) References Cited

U.S. PATENT DOCUMENTS 8,412,256 B2   4/2013   Lee et al.
9,066,357 B2   6/2015   Dimou et al.
(Continued)

FOREIGN PATENT DOCUMENTS

CN    101394649 A    3/2009
CN    101534560 A    9/2009
(Continued)

OTHER PUBLICATIONS

English version of the International Search Report in International Application No. PCT/CN2017/094119, dated Mar. 29, 2018.
(Continued)

*Primary Examiner* — Timothy J Weidner
(74) *Attorney, Agent, or Firm* — Finnegan, Henderson, Farabow, Garrett & Dunner, L.L.P.

(57) ABSTRACT

The present disclosure provides a method and apparatus for controlling interference from a controllable device. The method includes that: a target RB suffering interference from a controllable device is determined from all RBs for data transmission; a target notification message is generated, the target notification message containing an interference indication identifier and RB information of the target RB and the interference indication identifier being configured to indicate that the interference is from the controllable device; and the target notification message is transmitted to a target base station to reduce the interference from the controllable device over the target RB according to the target notification message, the target base station being a base station for providing service for the controllable device. According to the present disclosure, interference from a controllable device over a base station of a cellular network may be reduced.

7 Claims, 17 Drawing Sheets

(51) Int. Cl.

| | | |
|---|---|---|
| *H04B 17/382* | (2015.01) | |
| *H04J 11/00* | (2006.01) | |
| *H04L 5/00* | (2006.01) | |
| *H04W 24/02* | (2009.01) | |
| *H04W 24/08* | (2009.01) | |
| *H04W 24/10* | (2009.01) | |
| *H04W 28/02* | (2009.01) | |
| *H04W 28/08* | (2009.01) | |
| *H04W 68/00* | (2009.01) | |
| *H04W 72/04* | (2009.01) | |
| *H04W 72/08* | (2009.01) | |
| *H04W 84/02* | (2009.01) | |
| *H04W 88/02* | (2009.01) | |
| *H04W 88/08* | (2009.01) | |
| *H04W 88/12* | (2009.01) | |
| *H04W 92/02* | (2009.01) | |
| *H04W 92/10* | (2009.01) | |
| *H04W 92/12* | (2009.01) | |
| *H04W 92/20* | (2009.01) | |

(52) U.S. Cl.
CPC .......... *H04B 17/382* (2015.01); *H04J 11/005* (2013.01); *H04J 11/0026* (2013.01); *H04J 11/0066* (2013.01); *H04L 5/0032* (2013.01); *H04L 5/0073* (2013.01); *H04L 5/0085* (2013.01); *H04W 24/02* (2013.01); *H04W 24/08* (2013.01); *H04W 24/10* (2013.01); *H04W 28/0236* (2013.01); *H04W 28/0247* (2013.01); *H04W 28/0958* (2020.05); *H04W 68/005* (2013.01); *H04W 72/0426* (2013.01); *H04W 72/0433* (2013.01); *H04W 72/0453* (2013.01); *H04W 72/0466* (2013.01); *H04W 72/0473* (2013.01); *H04W 84/02* (2013.01); *H04W 88/02* (2013.01); *H04W 88/08* (2013.01); *H04W 88/12* (2013.01); *H04W 92/02* (2013.01); *H04W 92/10* (2013.01); *H04W 92/12* (2013.01); *H04W 92/20* (2013.01)

(58) Field of Classification Search
CPC .. H04J 2011/0003–0096; H04L 5/0001–0098; H04W 8/22–245; H04W 24/02–10; H04W 28/02–26; H04W 36/0005–385; H04W 48/02–20; H04W 52/02–60; H04W 68/005–12; H04W 72/005–14; H04W 84/005–22; H04W 88/005–188; H04W 92/02–24
See application file for complete search history.

(56) References Cited

U.S. PATENT DOCUMENTS

| | | | |
|---|---|---|---|
| 9,596,695 B2 | 3/2017 | Dimou et al. | |
| 2010/0267408 A1 | 10/2010 | Lee et al. | |
| 2011/0235598 A1 | 9/2011 | Hilborn | |
| 2011/0312342 A1* | 12/2011 | Eguchi | H04W 72/082 |
| 2014/0187255 A1 | 7/2014 | Dimou et al. | |
| 2015/0312918 A1 | 10/2015 | Dimou et al. | |
| 2016/0044689 A1 | 2/2016 | Wen et al. | |
| 2016/0157103 A1 | 6/2016 | Teng et al. | |
| 2017/0126309 A1 | 5/2017 | Rupasinghe et al. | |
| 2018/0295633 A1* | 10/2018 | Abdelmonem | H04W 72/082 |
| 2019/0052294 A1 | 2/2019 | Abdelmonem | |
| 2019/0268676 A1 | 8/2019 | Teichmann | |
| 2020/0236684 A1* | 7/2020 | Hong | H04W 72/082 |

FOREIGN PATENT DOCUMENTS

| | | | |
|---|---|---|---|
| CN | 101572868 A | 11/2009 | |
| CN | 101815301 A | 8/2010 | |
| CN | 101827053 A | 9/2010 | |
| CN | 101860880 A | 10/2010 | |
| CN | 102065488 A | 5/2011 | |
| CN | 102118800 A | 7/2011 | |
| CN | 102821418 A | 12/2012 | |
| CN | 103428871 A | 12/2013 | |
| CN | 204131534 U | 1/2015 | |
| CN | 104982086 A | 10/2015 | |
| CN | 105103640 A | 11/2015 | |
| CN | 107004345 A | 8/2017 | |
| EP | 2 288 217 A2 | 2/2011 | |
| WO | WO 2009/121010 A2 | 10/2009 | |
| WO | WO 2013/033907 A1 | 3/2013 | |
| WO | WO 2013/040742 A1 | 3/2013 | |
| WO | WO-2013033907 A1 * | 3/2013 | ........ H04W 72/1215 |
| WO | WO 2016/005003 A1 | 1/2016 | |
| WO | WO 2017/019595 A1 | 2/2017 | |
| WO | WO 2017/048446 A1 | 3/2017 | |

OTHER PUBLICATIONS

English version of the Written Opinion of the International Search Authority in International Application No. PCT/CN2017/094119, dated Mar. 29, 2018.
Extended European Search Report in the European Application No. 17919359.4, dated Feb. 28, 2020.
English version of International Search Report from the State Intellectual Property Office of People's Republic of China in corresponding International Application No. PCT/CN2017/096863 dated May 7, 2018.
English version of Written Opinion of the International Searching Authority from the State Intellectual Property Office of People's Republic of China in corresponding International Application No. PCT/CN2017/096863 dated May 7, 2018.
First Office Action dated Jul. 22, 2020, from the State Intellectual Property Office of People's Republic of China in Chinese application No. 201780001098.4.
Notice of Allowance issued in U.S. Appl. No. 16/633,541 dated Mar. 9, 2022.
3GPP TSG RAN WG1 Meeting #47bis, R1-070099, Sorrento, Italy, Jan. 15-19, 2007; Source: NTT DoCoMo; Title: Frequency Domain Channel-Dependent Scheduling Considering Interference to Neighbouring Cell for E-UTRA Uplink, 6 pages.
Office Action in U.S. Appl. No. 16/633,541, dated Sep. 2, 2022.

* cited by examiner

METHOD AND APPARATUS FOR CONTROLLING INTERFERENCE FROM CONTROLLABLE DEVICE

CROSS REFERENCE TO RELATED APPLICATIONS

This application is a national phase application based on PCT/CN2017/094119, filed Jul. 24, 2017, the content of which is incorporated herein by reference.

TECHNICAL FIELD

The present disclosure generally relates to the technical field of communications, and more particularly, to a method and apparatus for controlling interference from a controllable device.

BACKGROUND

At present, controllable devices are applied more and more widely. When a controllable device communicates with a cellular network, a signal of the controllable device is broadcast in a space. Besides a serving base station presently providing service for the controllable device, other base stations in the vicinity of the controllable device may also receive the signal from the controllable device. Therefore, interference may be brought to the other base stations than the serving base station.

However, in a new-generation network communication system, there has yet been no solution to control interference from a controllable device.

SUMMARY

For solving the problem in a related art, embodiments of the present disclosure provide a method and apparatus for controlling interference from a controllable device.

According to a first aspect of the embodiments of the present disclosure, a method for controlling interference from a controllable device is provided, which may be applied to a base station suffering the interference from the controllable device and include that:

a target resource block (RB) suffering the interference from the controllable device is determined from all RBs for data transmission;

a target notification message is generated, the target notification message containing an interference indication identifier and RB information of the target RB and the interference indication identifier being configured to indicate that the interference is from the controllable device; and the target notification message is transmitted to a target base station for the target base station to reduce the interference from the controllable device over the target RB according to the target notification message, the target base station being a base station for providing service for the controllable device.

Optionally, the operation that the target RB suffering the interference from the controllable device from all the RBs for data transmission is determined may include that:

all presently received interference signals are analyzed, and if each of all the presently received interference signals includes a target interference signal, it is determined that the base station is suffering the interference from the controllable device, the target interference signal being an interference signal generated by the interference from the controllable device; and after it is determined that the base station is suffering the interference from the controllable device, signal-to-noise ratios corresponding to all the RBs for data transmission are detected, and at least one RB is selected according to a sequence from high to low signal-to-noise ratios as the target RB suffering the interference from the controllable device.

Optionally, the operation that the target notification message is transmitted to the target base station may include that:

the target notification message is transmitted to the target base station through an interface between base stations.

Optionally, the operation that the target notification message is transmitted to the target base station may include that:

the target notification message is transmitted to a core network to forward the target notification message to the target base station.

According to a second aspect of the embodiments of the present disclosure, a method for controlling interference from a controllable device is provided, which may be applied to a base station for providing service for the controllable device and include that:

it is determined that a target notification message is received, the target notification message containing an interference indication identifier and RB information of a target RB and the interference indication identifier being configured to indicate that the interference is from the controllable device; and the interference from the controllable device over the target RB is reduced according to the target notification message.

Optionally, the operation that it is determined that the target notification message is received may include that:

it is determined that the target notification message transmitted by a base station suffering the interference from the controllable device is received; or it is determined that the target notification message forwarded by a core network is received, the target notification message being transmitted to the core network by the base station suffering the interference from the controllable device.

Optionally, after the operation that it is determined that the target notification message is received, the method may further include that:

whether there is a controllable device that is using a resource corresponding to the target RB or not is detected; and if there is a controllable device that is using the resource corresponding to the target RB, the step that the interference from the controllable device over the target RB is reduced according to the target notification message is executed.

Optionally, the operation that the interference from the controllable device over the target RB is reduced may include that:

power at the target RB is reduced; or other resources are allocated for the controllable device that is using the resource corresponding to the target RB, the other resources being resources corresponding to other RBs than the target RB.

According to a third aspect of the embodiments of the present disclosure, a apparatus for controlling interference from a controllable device is provided, which may be applied to a base station suffering the interference from the controllable device and include:

a first determination module, configured to determine a target RB suffering the interference from the controllable device in all RBs for data transmission;

a message generation module, configured to generate a target notification message, the target notification message containing an interference indication identifier and RB information of the target RB and the interference indication identifier being configured to indicate that the interference is from the controllable device; and a transmission module, configured to transmit the target notification message to a target base station for the target base station to reduce the interference from the controllable device over the target RB according to the target notification message, the target base station being a base station for providing service for the controllable device.

Optionally, the first determination module may include:

a first determination submodule, configured to analyze all presently received interference signals and, if all the presently received interference signals include a target interference signal, determine that the base station is suffering the interference from the controllable device, the target interference signal being an interference signal generated by the interference from the controllable device; and a second determination submodule, configured to detect signal-to-noise ratios corresponding to all the RBs for data transmission and select at least one RB according to a sequence from high to low signal-to-noise ratios as the target RB suffering the interference from the controllable device.

Optionally, the transmission module may include:

a first transmission submodule, configured to transmit the target notification message to the target base station through an interface between the base stations.

Optionally, the transmission module may include:

a second transmission submodule, configured to transmit the target notification message to a core network to forward the target notification message to the target base station.

According to a fourth aspect of the embodiments of the present disclosure, a apparatus for controlling interference from a controllable device is provided, which may be applied to a base station for providing service for the controllable device and include:

a second determination module, configured to determine that a target notification message is received, the target notification message containing an interference indication identifier and RB information of a target RB and the interference indication identifier being configured to indicate that the interference is from the controllable device; and an execution module, configured to reduce the interference from the controllable device over the target RB according to the target notification message.

Optionally, the second determination module may include any one of the following submodules:

a third determination submodule, configured to determine that the target notification message transmitted by a base station suffering the interference from the controllable device is received; and a fourth determination submodule, configured to determine that the target notification message forwarded by a core network is received, the target notification message being transmitted to the core network by the base station suffering the interference from the controllable device.

Optionally, the apparatus may further include:

a detection module, configured to detect whether there is a controllable device that is using a resource corresponding to the target RB or not; and a control module, configured to, if there is a controllable device that is using the resource corresponding to the target RB, control the execution module to reduce the interference from the controllable device over the target RB according to the target notification message.

Optionally, the execution module may include any one of the following submodules:

a first execution submodule, configured to reduce power at the target RB; and a second execution submodule, configured to allocate other resources for the controllable device that is using the resource corresponding to the target RB, the other resources being resources corresponding to other RBs than the target RB.

According to a fifth aspect of the embodiments of the present disclosure, a computer-readable storage medium is provided, which may store a computer program, the computer program being configured to execute the method for controlling the interference from the controllable device in the first aspect.

According to a sixth aspect of the embodiments of the present disclosure, a computer-readable storage medium is provided, which may store a computer program, the computer program being configured to execute the method for controlling the interference from the controllable device in the second aspect.

According to a seventh aspect of the embodiments of the present disclosure, a apparatus for controlling interference from a controllable device is provided, which may be applied to a base station suffering the interference from the controllable device and include:

a processor; and a memory configured to store an instruction executable for the processor, wherein the processor may be configured to:

determine a target RB suffering the interference from the controllable device in all RBs for data transmission;

generate a target notification message, the target notification message containing an interference indication identifier and RB information of the target RB and the interference indication identifier being configured to indicate that the interference is from the controllable device; and transmit the target notification message to a target base station for the target base station to reduce the interference from the controllable device over the target RB according to the target notification message, the target base station being a base station for providing service for the controllable device.

According to an eighth aspect of the embodiments of the present disclosure, a apparatus for controlling interference from a controllable device is provided, which may be applied to a base station for providing service for the controllable device and include:

a processor; and a memory configured to store an instruction executable for the processor, wherein the processor may be configured to:

determine that a target notification message is received, the target notification message containing an interference indication identifier and RB information of a target RB and the interference indication identifier being configured to indicate that the interference is from the controllable device; and reduce the interference from the controllable device over the target RB according to the target notification message.

The technical solutions provided by the embodiments of the present disclosure may have the following beneficial effects.

In the embodiments of the present disclosure, the base station suffering the interference from the controllable device may determine the target RB suffering the interference from the controllable device from all the RBs for data transmission. Furthermore, the target notification message is generated, the target notification message containing the interference identification information configured to indicate that the interference is from the controllable device and the RB information of the target RB. The base station suffering the interference from the controllable device transmits the target notification message to the target base station for providing the service for the controllable device for the target base station to reduce the interference from the controllable device over the target RB according to the target notification message. Through such a process, interference from a controllable device over a base station of a cellular network may be reduced.

In the embodiments of the present disclosure, the base station suffering the interference from the controllable device may analyze all the presently received interference signals and, if the target interference signal is included, determines that the base station is suffering the interference from the controllable device. After it is determined that the base station is suffering the interference from the controllable device, the signal-to-noise ratios corresponding to all the RBs for data transmission may be detected, and the at least one RB is selected according to the sequence from high to low signal-to-noise ratios as the target RB suffering the interference from the controllable device. Through such a process, existence of the interference from the controllable device at present and the RB information of the target RB suffering the interference may be determined.

In the embodiments of the present disclosure, the base station suffering the interference from the controllable device may directly transmit the generated target notification message to the target base station through the interface between the base stations. Or the base station suffering the interference from the controllable device may transmit the target notification message to the core network for the core network to forward to the target base station. Therefore, the target base station may subsequently reduce the interference from the controllable device over the target RB to reduce the interference from the controllable device over the base station of the cellular network.

In the embodiments of the present disclosure, the base station for providing the service for the controllable device, after determining that the target notification message is received, may reduce the interference from the controllable device over the target RB according to the target notification message. The purpose of reducing the interference from the controllable device over the base station of the cellular network is achieved.

In the embodiments of the present disclosure, the base station for providing the service for the controllable device, after determining that the target notification message is received, may detect whether there is a controllable device that is using the resource corresponding to the target RB or not at first and, if there is a controllable device that is using the resource corresponding to the target RB, may reduce the interference from the controllable device over the target RB to ensure that the interference from the controllable device over the base station of the cellular network may be reduced.

In the embodiments of the present disclosure, the base station for providing the service for the controllable device may reduce the interference from the controllable device over the base station of the cellular network in a manner of reducing the power at the target RB or allocating the other resource for the controllable device that is using the resource corresponding to the target RB, and high applicability is ensured.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Terms used in the present disclosure are only adopted for the purpose of describing specific embodiments and not intended to limit the present disclosure. "A/an", "said" and "the" in a singular form in the present disclosure and the appended claims are also intended to include a plural form, unless other meanings are clearly denoted throughout the present disclosure. It is also to be understood that term "and/or" used in the present disclosure refers to and includes one or any or all possible combinations of multiple associated items that are listed.

It is to be understood that, although terms "first", "second", "third" and the like may be adopted to describe various information in the present disclosure, the information should not be limited to these terms. These terms are only adopted to distinguish the information of the same type. For example, without departing from the scope of the present disclosure, first information may also be called second information and, similarly, second information may also be called first information. For example, term "if" used here may be explained as "while" or "when" or "responsive to determining", which depends on the context.

Figure 1:
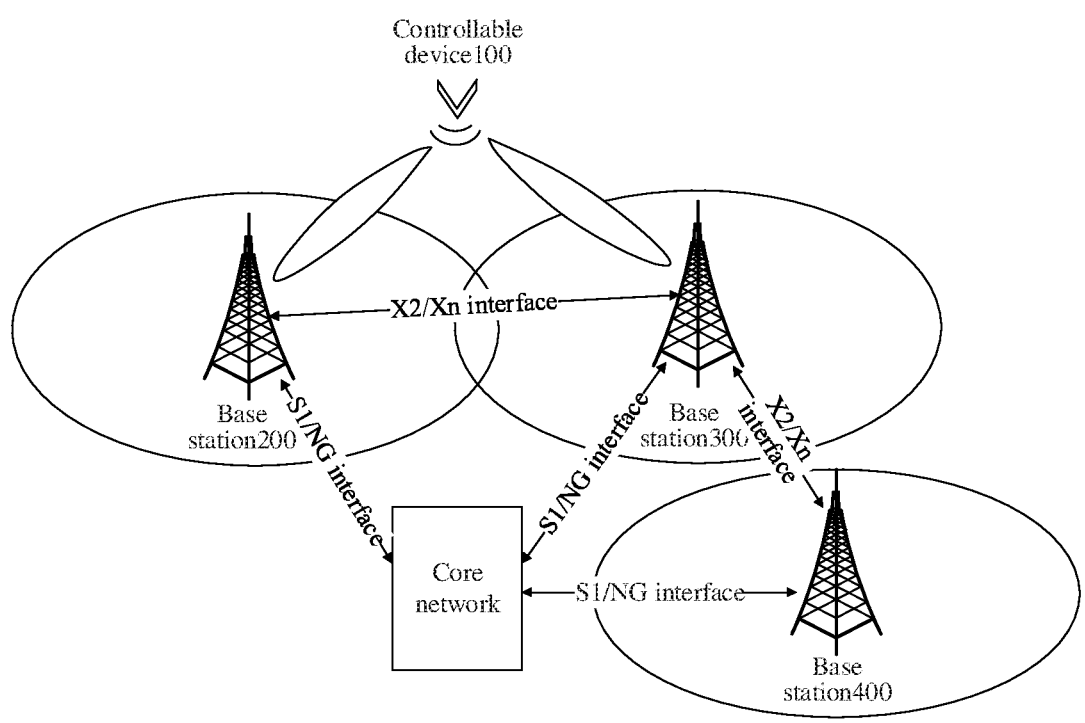
FIG. 1 is a schematic diagram illustrating a scenario where interference from a controllable device is controlled, according to an exemplary embodiment.

In the embodiments of the present disclosure, a controllable device may be an unmanned aerial vehicle, a controllable robot and the like. As shown in FIG. 1, a base station presently providing service for a controllable device 100 is a base station 200. However, since a signal transmitted by the controllable device 100 propagates in a space, a base station 300 may also receive the signal transmitted by the controllable device 100, and interference may be brought to the base station 300.

The base station 200, the base station 300 and a base station 400 may be connected through interfaces, for example, X2 or Xn interfaces, between the base stations. If there are no direct connecting interfaces between the base stations, the base station 200, the base station 300 and the base station 400 may be connected with a core network through interfaces, for example, S1 or NG interfaces, between the base stations and the core network respectively.

Figure 2:
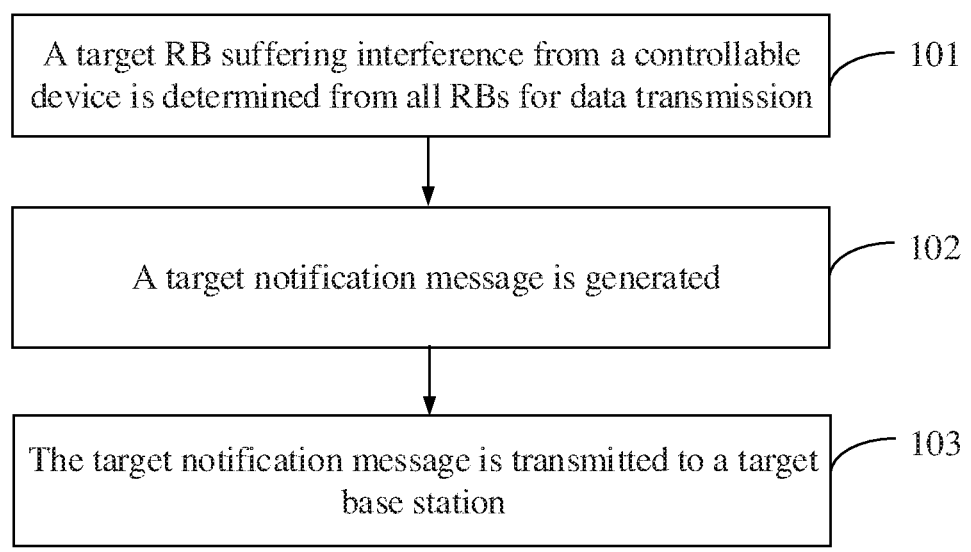
FIG. 2 is a flow chart showing a method for controlling interference from a controllable device, according to an exemplary embodiment.

For solving the technical problem, an embodiment of the present disclosure provides a method for controlling interference from a controllable device. Referring to FIG. 2, FIG. 2 is a flow chart showing a method for controlling interference from a controllable device, according to an exemplary embodiment. The method may be applied to a base station 300 suffering interference from a controllable device in the scenario shown in FIG. 1, and includes the following steps.

In Step 101, a target RB suffering interference from the controllable device is determined from all RBs for data transmission.

In Step 102, a target notification message is generated, the target notification message containing an interference indication identifier and RB information of the target RB and the interference indication identifier being configured to indicate that the interference is from the controllable device.

In Step 103, the target notification message is transmitted to a target base station for the target base station to reduce the interference from the controllable device over the target RB according to the target notification message, the target base station being a base station for providing service for the controllable device.

In the embodiment, the base station suffering the interference from the controllable device may determine the target RB suffering the interference from the controllable device from all the RBs for data transmission. Furthermore, the target notification message is generated, the target notification message containing the interference identification information configured to indicate that the interference is from the controllable device and the RB information of the target RB. The base station suffering the interference from the controllable device transmits the target notification message to the target base station for providing the service for the controllable device for the target base station to reduce the interference from the controllable device over the target RB according to the target notification message. Through such a process, interference from a controllable device over a base station of a cellular network may be reduced.

Figure 3:
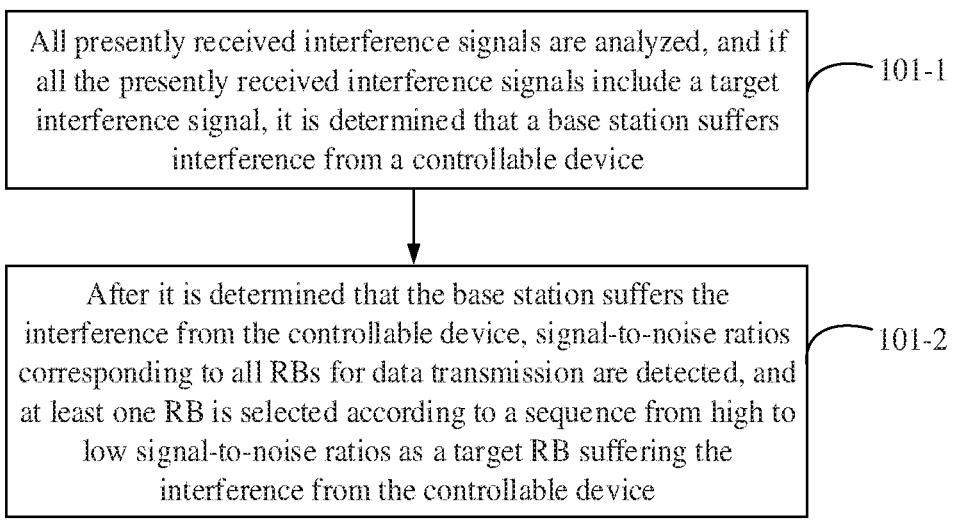
FIG. 3 is a flow chart showing another method for controlling interference from a controllable device, according to an exemplary embodiment.

For Step 101, optionally, referring to FIG. 3, FIG. 3 is a flow chart showing another method for controlling interference from a controllable device, according to the embodiment shown in FIG. 2. Step 101 may include the following steps.

In Step 101-1, all presently received interference signals are analyzed, and if all the presently received interference signals include a target interference signal, it is determined that the base station is suffering the interference from the controllable device, the target interference signal being an interference signal generated by the interference from the controllable device.

In the step, the base station may analyze all the presently received interference signals according to the related art to acquire signal parameter values corresponding to all the interference signals, the signal parameter value including a transmission mode, a code rate, transmit power and the like.

In the embodiment of the present disclosure, the base station may analyze the signal parameter values to determine whether all the interference signals include the target interference signal or not, the target interference signal being an interference signal generated by the interference from the controllable device.

If all the interference signals include the target interference signal, for example, the target interference signal is a signal 1 and all the interference signals presently received by the base station include the signal 1, it may be determined that the base station is suffering the interference from the controllable device.

If signal identification information indicates that a present signal is from the controllable device, the base station may also directly determine that the base station is suffering the interference from the controllable device.

In Step 101-2, after it is determined that the base station is suffering the interference from the controllable device, signal-to-noise ratios corresponding to all the RBs for data transmission are detected, and at least one RB is selected according to a sequence from high to low signal-to-noise ratios as the target RB suffering the interference from the controllable device.

In the step, the base station may detect the signal-to-noise ratios corresponding to all the RBs for data transmission according to the related art. If the interference exists, the signal-to-noise ratio corresponding to the RB may be relatively high. Therefore, the at least one RB may be selected according to the sequence from high to low signal-to-noise ratios as the target RB suffering the interference from the controllable device.

For Step 102, the base station suffering the interference from the controllable device, after determining the target RB suffering the interference from the controllable device, may generate a target notification message. The target notification message may contain an interference indication identifier, the interference indication identifier being configured to indicate that the interference is from the controllable device, and indicate the RB information of the target RB.

The target notification message may be configured to notify that there is a base station suffering the interference from the controllable device at present and the base station suffers the interference at the target RB.

For Step 103, the base station suffering the interference from the controllable device may directly transmit the target notification message to a base station nearby through an interface between the base stations. In a 4th-Generation (4G) network, the interface between the base stations is an X2 interface. In a 5th-Generation (5G) network, the interface between the base stations is an Xn interface.

If there is no direct interface between the base stations, the base station suffering the interference from the controllable device may transmit the target notification message to a core network, and then the core network may forward the target notification message to the base station nearby. The base station may transmit the target notification message to the core network through an interface between the base station and the core network. In the 4G network, the interface between the base station and the core network is an S1 interface. In the 5G network, the interface between the base station and the core network is an NG interface.

The base station having received the target notification message may detect whether there is an unmanned aerial vehicle that is served by it and is using the target RB. If there is an unmanned aerial vehicle that is served by it and is using the target RB, the base station may reduce the interference from the controllable device over the target RB according to the target notification message. If there is no unmanned aerial vehicle that is served by it and is using the target RB, the target notification message may be ignored.

Figure 4:
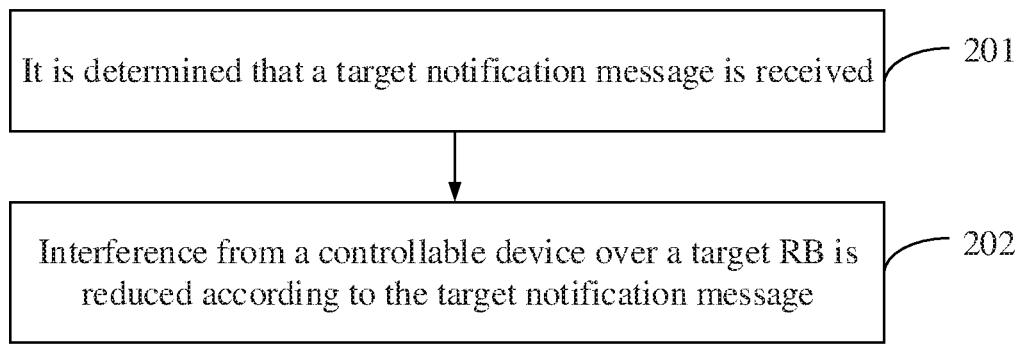
FIG. 4 is a flow chart showing another method for controlling interference from a controllable device, according to an exemplary embodiment.

An embodiment of the present disclosure provides a method for controlling interference from a controllable device. Referring to FIG. 4, FIG. 4 is a flow chart showing a method for controlling interference from a controllable device, according to an exemplary embodiment. The method may be applied to a base station 200 for providing service for a controllable device in the scenario shown in FIG. 1, and includes the following steps.

In Step 201, it is determined that a target notification message is received, the target notification message containing an interference indication identifier and RB information of a target RB, and the interference indication identifier being configured to indicate that the interference is from the controllable device.

In Step 202, the interference from the controllable device over the target RB is reduced according to the target notification message.

In the embodiment, the base station for providing the service for the controllable device, after determining that the target notification message is received, may reduce the interference from the controllable device over the target RB according to the target notification message. The purpose of reducing interference from a controllable device over a base station of a cellular network is achieved.

For Step 201, a base station interfered by the controllable device may generate the target notification message after determining the interfered target RB, and may further directly transmit the generated target notification message through an interface between base stations to the base station which is for providing service for the controllable device. Or the base station interfered by the controllable device, after generating the target notification message, may transmit the target notification message to a core network through an interface between a base station and the core network, and then the core network forwards the target notification message to the base station which is for providing service for the controllable device. The target notification message contains the interference indication identifier and the RB information of the target RB, the interference indication identifier being for indicating that the interference is from the controllable device.

Correspondingly, the base station for providing the service for the controllable device may directly receive the target notification message through an interface between the base stations or receive the target notification message forwarded by the core network through an interface between the base station and the core network, thereby determining that the target notification message is received.

For Step 202, the base station is required to reduce the interference from the controllable device over the target RB. Optionally, any one of the following manners may be adopted.

In a first manner, power at the target RB is reduced.

Figure 5:
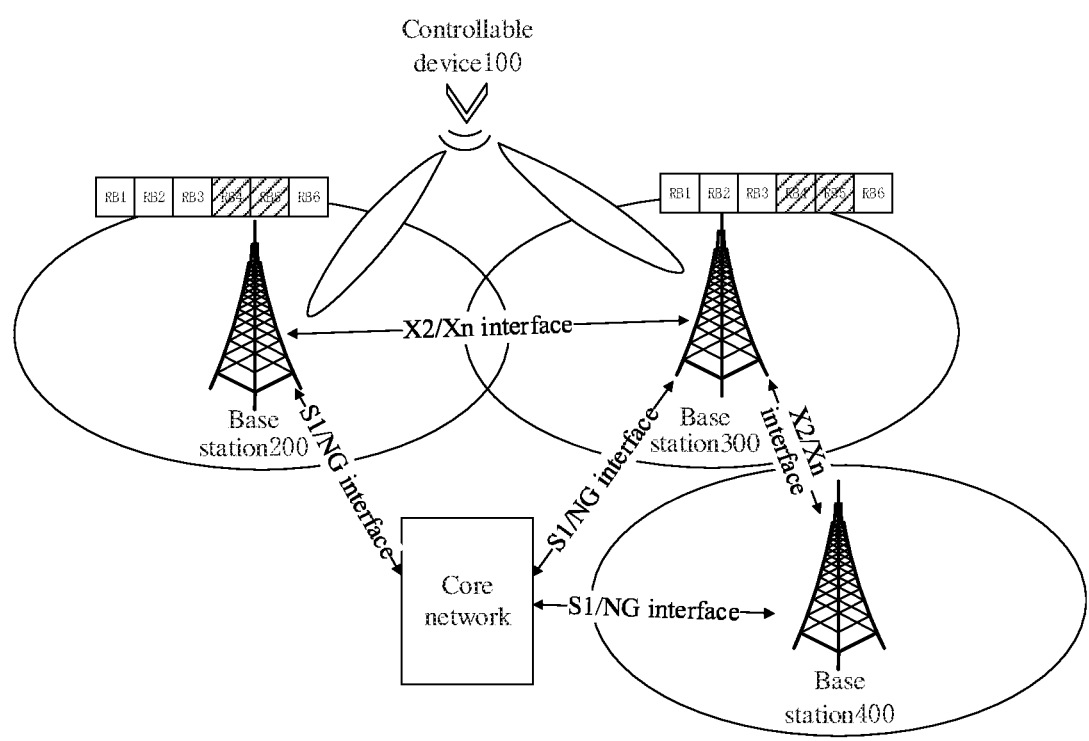
FIG. 5 is a schematic diagram illustrating another scenario where interference from a controllable device is controlled, according to an exemplary embodiment.

The base station for providing the service for the controllable device may reduce the power at the target RB. For example, a base station 300 shown in FIG. 5 suffers interference from an unmanned aerial vehicle at target RB4 and RB5, and then a base station 200 for providing service for the unmanned aerial vehicle may reduce power thereof at RB4 and RB5.

In the embodiment of the present disclosure, in the manner of reducing the power at the target RB, the interference from the controllable device over the base station 300 suffering the interference from the controllable device may be reduced.

In a second manner, other resources may be allocated for the controllable device that is using a resource corresponding to the target RB, the other resources being resources corresponding to other RBs than the target RB.

The base station for providing the service for the controllable device may schedule the resource for the controllable device to other RBs. For example, the base station 300 shown in FIG. 5 suffers the interference from the unmanned aerial vehicle at target RB4 and RB5, and then the base station 200 for providing the service for the unmanned aerial vehicle may not provide the service for the unmanned aerial vehicle through RB4 and RB5 anymore and, instead, may provide the service for the unmanned aerial vehicle through resources corresponding to other RBs, for example, RB1 and RB2.

In the embodiment of the present disclosure, in the manner of allocating other resources for the controllable device, occupation of the target RB by the controllable device may be avoided, that is, the interference from the controllable device over the base station 300 suffering the interference from the controllable device is reduced.

Figure 6:
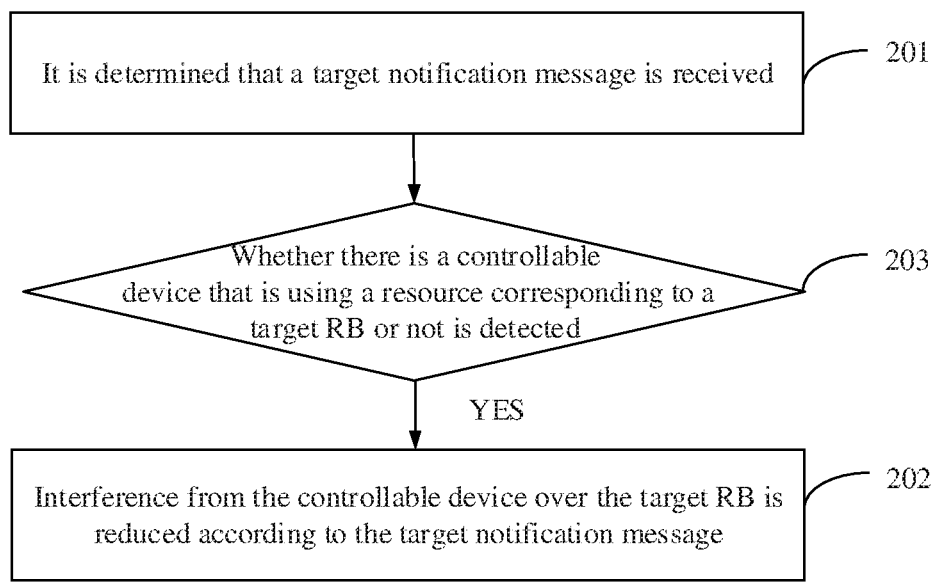
FIG. 6 is a flow chart showing another method for controlling interference from a controllable device, according to an exemplary embodiment.

In an embodiment, referring to FIG. 6, FIG. 6 is a flow chart showing another method for controlling interference from a controllable device, according to the embodiment shown in FIG. 4. After Step 201 is completed, the method for controlling interference from the controllable device may further include the following step.

In Step 203, whether there is a controllable device that is using a resource corresponding to the target RB is detected.

In the step, the base station, after determining that the target notification message is received, may first detect whether there is a controllable device that is served by it and is using the resource of the target RB indicated by the target notification message.

If it is determined that there is a controllable device that is served by it and is using the resource of the target RB indicated by the target notification message, the base station may execute Step 202 to reduce the interference from the controllable device over the target RB according to the target notification message. If there is no controllable device that is served by it and is using the resource of the target RB indicated by the target notification message, the target notification message is directly ignored.

In the embodiment, the base station for providing the service for the controllable device, after determining that the target notification message is received, may first detect whether there is a controllable device that is using the resource corresponding to the target RB and, if there is a controllable device that is using the resource corresponding to the target RB, may reduce the interference from the controllable device over the target RB to ensure that the interference from the controllable device over the base station of the cellular network may be reduced.

Figure 7:
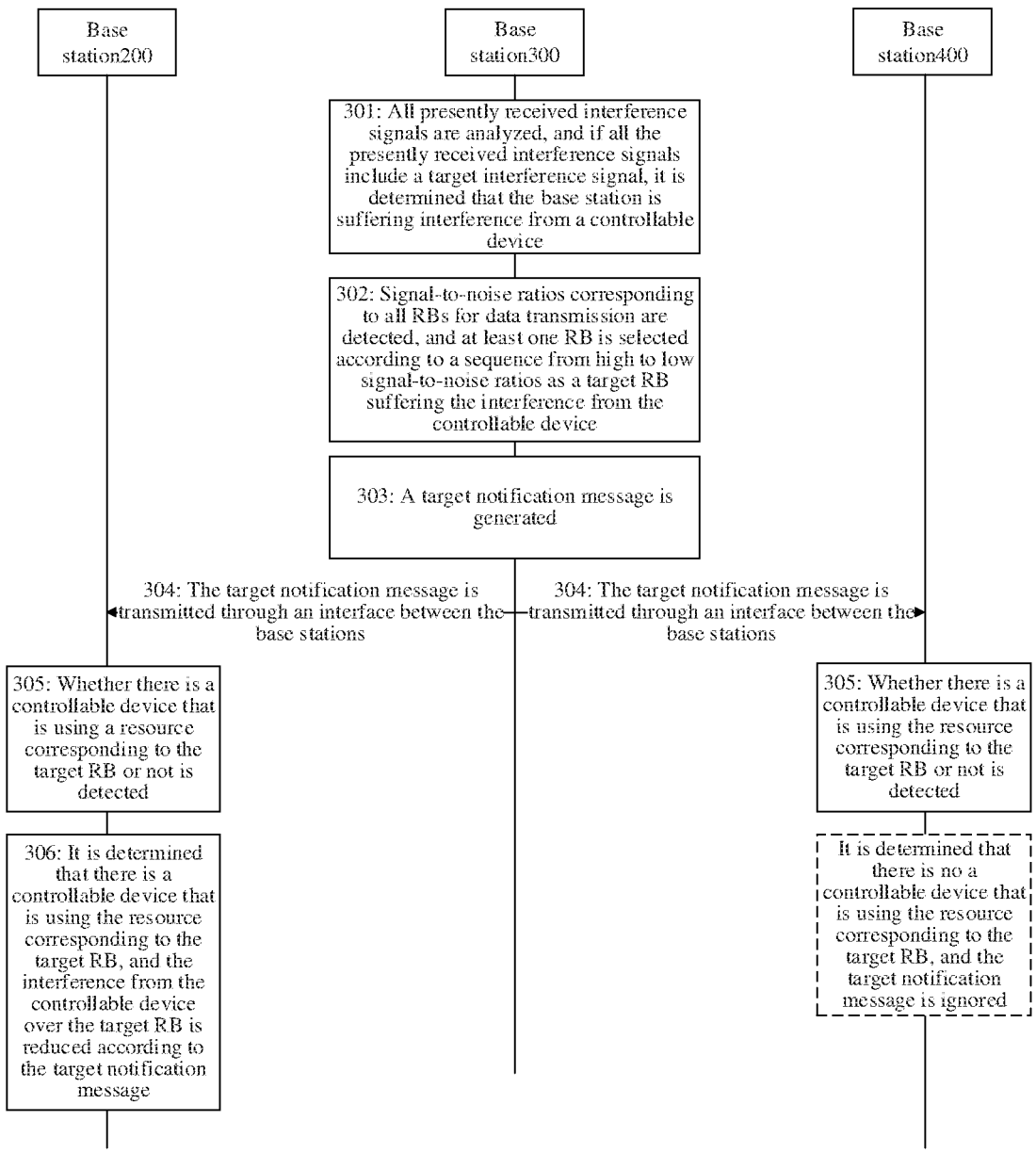
FIG. 7 is a schematic diagram illustrating another scenario where interference from a controllable device is controlled, according to an exemplary embodiment.

Referring to FIG. 7, FIG. 7 is a flow chart showing another method for controlling interference from a controllable device, according to the embodiment shown in FIG. 1. The method includes the following steps.

In Step 301, a base station 300 analyzes all presently received interference signals and, if all the presently received interference signals include a target interference signal, determines that the base station is suffering interference from a controllable device.

In Step 302, the base station 300 detects signal-to-noise ratios corresponding to all RBs for data transmission and selects at least one RB according to a sequence from high to low signal-to-noise ratios as a target RB suffering the interference from the controllable device.

In Step 303, the base station 300 generates a target notification message, the target notification message containing an interference indication identifier and RB information of the target RB and the interference indication identifier being configured to indicate that the interference is from the controllable device.

In Step 304, the base station 300 transmits the target notification message to a base station 200, base station 400 and the like nearby through interfaces between the base stations.

In Step 305, the base station 200 and the base station 400 detect whether there is a controllable device that is using a resource corresponding to the target RB or not.

In Step 306, the base station 200 determines that there is a controllable device that is using the resource corresponding to the target RB, and the base station 200 reduces the interference from the controllable device over the target RB according to the target notification message.

The base station 400 determines that there is no controllable device that is using the resource corresponding to the target RB, and the base station 400 ignores the target notification message.

In the embodiment, the base station 300 suffering the interference from the controllable device transmits the target notification message to the base station 200 and the base station 400 through the interfaces between the base stations. The base station 200 determines that there is a controllable device that is using the resource corresponding to the target RB, and then the base station may reduce the interference from the controllable device over the target RB according to the target notification message. The base station 400 determines that there is no controllable device that is using the resource corresponding to the target RB, and the base station 400 does not execute any processing. Through such a process, interference from a controllable device over a base station of a cellular network may be reduced.

In an embodiment, in Step 304, if there are no direct interfaces between the base stations, the base station 300 may transmit the target notification message to a core network through an interface between the base station and the core network, and then the core network forwards it to the base station 200 and the base station 400. The interference from the controllable device over the base station of the cellular network may also be reduced finally.

For simple description, each of the abovementioned method embodiments is expressed as a combination of a series of operations, but those skilled in the art should know that the present disclosure is not limited to the described operation sequence because some steps may be executed in other sequences or at the same time according to the present disclosure.

Second, those skilled in the art should also know that all the embodiments described in the specification are optional embodiments and involved operations and modules are not always required by the present disclosure.

Corresponding to the abovementioned embodiments of methods for realizing application functions, the present disclosure also provides embodiments of an apparatus for application function realization and a corresponding terminal.

Figure 8:
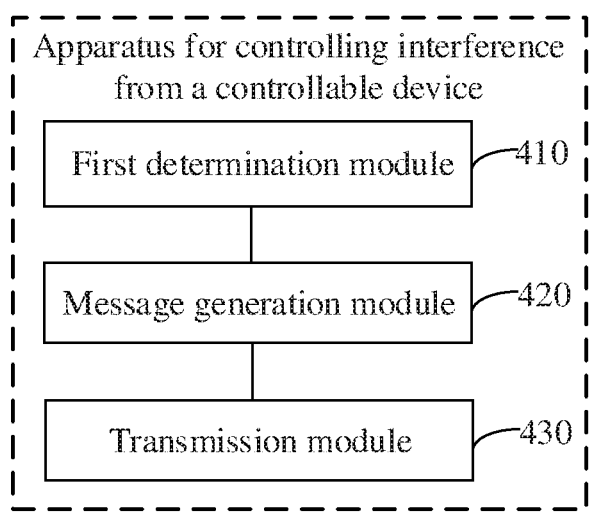
FIG. 8 is a block diagram of an apparatus for controlling interference from a controllable device, according to an exemplary embodiment.

FIG. 8 is a block diagram of an apparatus for controlling interference from a controllable device, according to an exemplary embodiment. The apparatus is applied to a base station suffering interference from a controllable device. The apparatus includes:

a first determination module 410, configured to determine, from all RBs for data transmission, a target RB suffering interference from the controllable device;

a message generation module 420, configured to generate a target notification message, the target notification message containing an interference indication identifier and RB information of the target RB and the interference indication identifier being configured to indicate that the interference is from the controllable device; and a transmission module 430, configured to transmit the target notification message to a target base station for the target base station to reduce the interference from the controllable device over the target RB according to the target notification message, the target base station being a base station for providing service for the controllable device.

Figure 9:
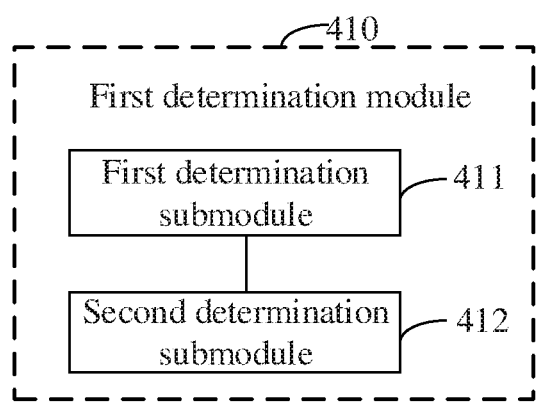
FIG. 9 is a block diagram of another apparatus for controlling interference from a controllable device, according to an exemplary embodiment.

Referring to FIG. 9, FIG. 9 is a block diagram of another apparatus for controlling interference from a controllable device based on the embodiment shown in FIG. 8. The first determination module 410 includes:

a first determination submodule 411, configured to analyze all presently received interference signals and, if all the presently received interference signals include a target interference signal, determine that the base station is suffering the interference from the controllable device, the target interference signal being an interference signal generated by the interference from the controllable device; and a second determination submodule 412, configured to detect signal-to-noise ratios corresponding to all the RBs for data transmission and select at least one RB according to a sequence from high to low signal-to-noise ratios as the target RB suffering the interference from the controllable device.

Figure 10:
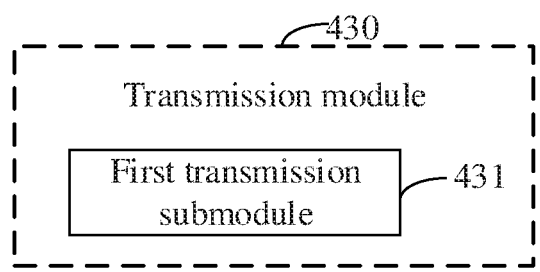
FIG. 10 is a block diagram of another apparatus for controlling interference from a controllable device, according to an exemplary embodiment.

Referring to FIG. 10, FIG. 10 is a block diagram of another apparatus for controlling interference from a controllable device based on the embodiment shown in FIG. 8. The transmission module 430 includes:

a first transmission submodule 431, configured to transmit the target notification message to the target base station through an interface between the base stations.

Figure 11:
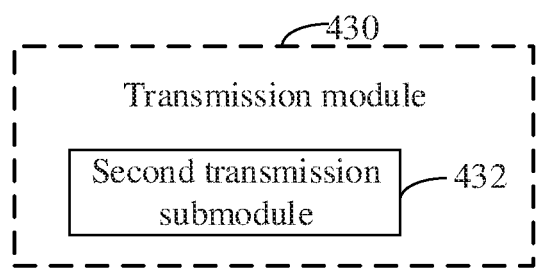
FIG. 11 is a block diagram of another apparatus for controlling interference from a controllable device, according to an exemplary embodiment.

Referring to FIG. 11. FIG. 11 is a block diagram of another apparatus for controlling interference from a controllable device based on the embodiment shown in FIG. 8. The transmission module 430 includes:

a second transmission submodule 432, configured to transmit the target notification message to a core network for the core network to forward the target notification message to the target base station.

Figure 12:
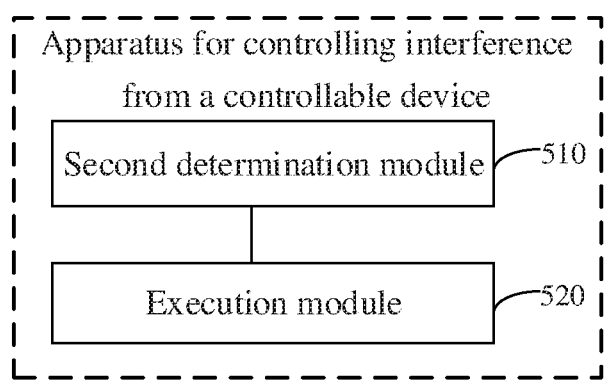
FIG. 12 is a block diagram of another apparatus for controlling interference from a controllable device, according to an exemplary embodiment.

FIG. 12 is a block diagram of an apparatus for controlling interference from a controllable device, according to an exemplary embodiment. The apparatus is applied to a base station for providing service for a controllable device. The apparatus includes:

a second determination module 510, configured to determine that a target notification message is received, the target notification message containing an interference indication identifier and RB information of a target RB and the interference indication identifier being configured to indicate that the interference is from the controllable device; and an execution module 520, configured to reduce the interference from the controllable device over the target RB according to the target notification message.

Figure 13:
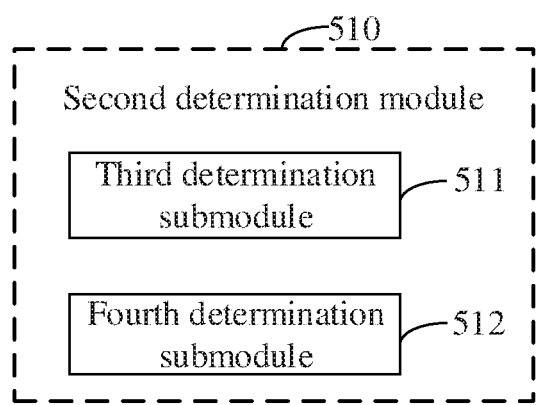
FIG. 13 is a block diagram of another apparatus for controlling interference from a controllable device, according to an exemplary embodiment.

Referring to FIG. 13, FIG. 13 is a block diagram of another apparatus for controlling interference from a controllable device based on the embodiment shown in FIG. 12. The second determination module 510 includes any one of the following submodules:

a third determination submodule 511, configured to determine that the target notification message transmitted by a base station suffering the interference from the controllable device is received; and a fourth determination submodule 512, configured to determine that the target notification message forwarded by a core network is received, the target notification message being transmitted to the core network by the base station suffering the interference from the controllable device.

Figure 14:
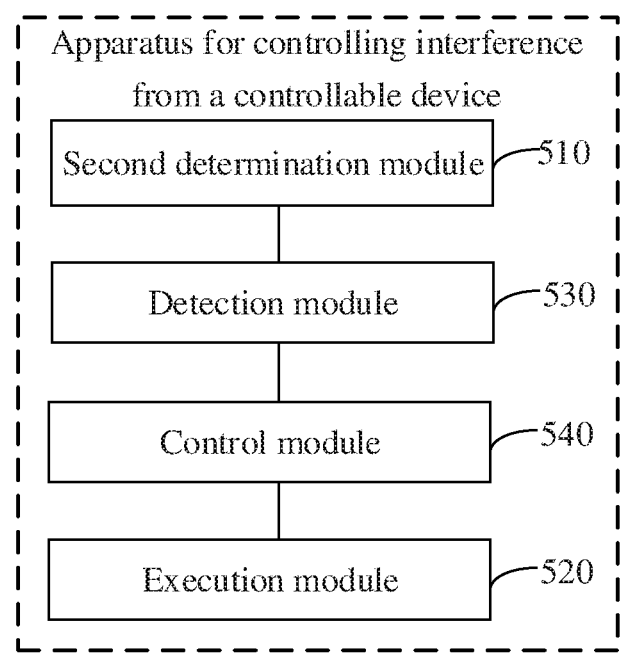
FIG. 14 is a block diagram of another apparatus for controlling interference from a controllable device, according to an exemplary embodiment.

Referring to FIG. 14, FIG. 14 is a block diagram of another apparatus for controlling interference from a controllable device based on the embodiment shown in FIG. 12. The apparatus further includes:

a detection module 530, configured to detect whether there is a controllable device that is using a resource corresponding to the target RB or not and a control module 540, configured to, if there is a controllable device that is using the resource corresponding to the target RB, control the execution module 520 to reduce the interference from the controllable device over the target RB according to the target notification message.

Figure 15:
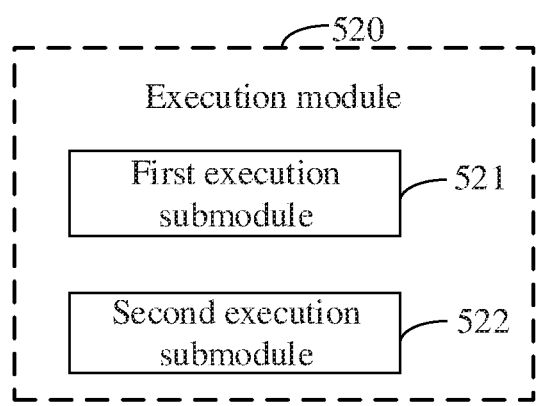
FIG. 15 is a block diagram of another apparatus for controlling interference from a controllable device, according to an exemplary embodiment.

Referring to FIG. 15, FIG. 15 is a block diagram of another apparatus for controlling interference from a controllable device based on the embodiment shown in FIG. 14. The execution module 520 includes any one of the following submodules:

a first execution submodule 521, configured to reduce power at the target RB; and a second execution submodule 522, configured to allocate other resources for the controllable device that is using the resource corresponding to the target RB, the other resources being resources corresponding to other RBs than the target RB.

The apparatus embodiments substantially correspond to the method embodiments, and thus related parts refer to part of descriptions of the method embodiments. The apparatus embodiments described above are only schematic, units described as separate parts therein may or may not be physically separated, and parts displayed as units may or may not be physical units, and namely may be located in the same place or may also be distributed to multiple network units. Part or all of the modules therein may be selected according to a practical requirement to achieve the purpose of the solutions of the present disclosure. Those of ordinary skill in the art may understand and implement without creative work.

Correspondingly, the present disclosure also provides a computer-readable storage medium is provided, which stores a computer program, the computer program being configured to execute the method, applied to a base station suffering interference from a controllable device, for controlling the interference from the controllable device.

Correspondingly, the present disclosure also provides a computer-readable storage medium is provided, which stores a computer program, the computer program being configured to execute the method, applied to a base station for providing service for a controllable device, for controlling the interference from the controllable device.

Correspondingly, the present disclosure also provides an apparatus for controlling interference from a controllable device, which is applied to a base station suffering the interference from the controllable device and includes:

a processor; and a memory configured to store an instruction executable for the processor, wherein the processor is configured to:

determine, from all RBs for data transmission, a target RB suffering the interference from the controllable device;

generate a target notification message, the target notification message containing an interference indication identifier and RB information of the target RB and the interference indication identifier being configured to indicate that the interference is from the controllable device; and transmit the target notification message to a target base station for the target base station to reduce the interference from the controllable device over the target RB according to the target notification message, the target base station being a base station for providing service for the controllable device.

Figure 16:
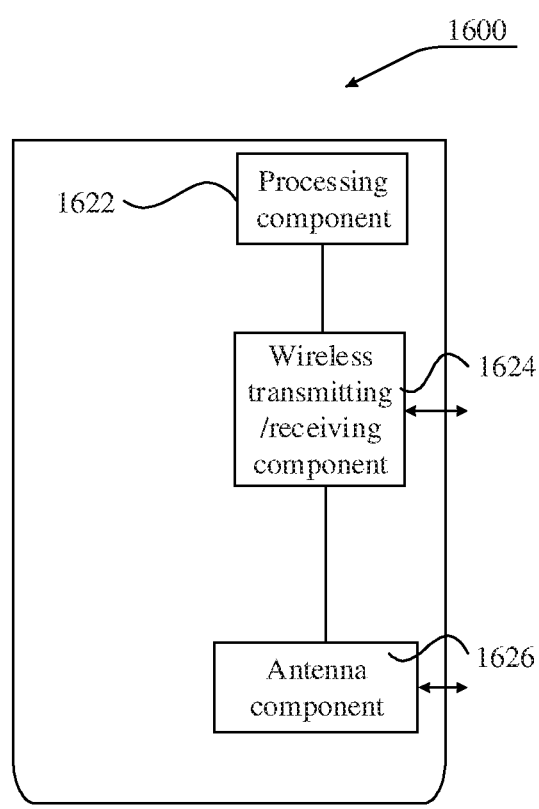
FIG. 16 is a structure diagram of an apparatus for controlling interference from a controllable device, according to an exemplary embodiment of the present disclosure.

As shown in FIG. 16, FIG. 16 is a structure diagram of an apparatus 1600 for controlling interference from a controllable device, according to an exemplary embodiment. The apparatus 1600 may be provided as a base station. Referring to FIG. 16, the apparatus 1600 includes a processing component 1622, a wireless transmitting/receiving component 1624, an antenna component 1626 and a wireless interface-specific signal processing part, and the processing component 1622 may further include one or more processors.

One processor in the processing component 1622 may be configured to:

determine, from all RBs for data transmission, a target RB suffering the interference from the controllable device;

generate a target notification message, the target notification message containing an interference indication identifier and RB information of the target RB and the interference indication identifier being configured to indicate that the interference is from the controllable device; and transmit the target notification message to a target base station for the target base station to reduce the interference from the controllable device over the target RB according to the target notification message, the target base station being a base station for providing service for the controllable device.

Correspondingly, the present disclosure also provides an apparatus for controlling interference from a controllable device, which is applied to a base station for providing service for the controllable device and includes:

a processor; and a memory configured to store an instruction executable for the processor, wherein the processor is configured to:

determine that a target notification message is received, the target notification message containing an interference indication identifier and RB information of a target RB and the interference indication identifier being configured to indicate that the interference is from the controllable device; and reduce the interference from the controllable device over the target RB according to the target notification message.

Figure 17:
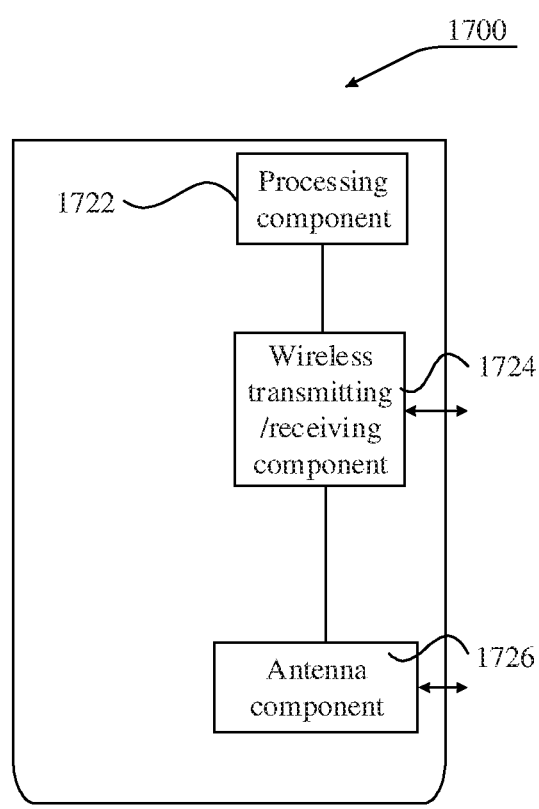
FIG. 17 is a structure diagram of another apparatus for controlling interference from a controllable device, according to an exemplary embodiment of the present disclosure.

As shown in FIG. 17, FIG. 17 is a structure diagram of an apparatus 1700 for controlling interference from a controllable device, according to an exemplary embodiment. The apparatus 1700 may be provided as a base station. Referring to FIG. 17, the apparatus 1700 includes a processing component 1722, a wireless transmitting/receiving component 1724, an antenna component 1726 and a wireless interface-specific signal processing part, and the processing component 1722 may further include one or more processors.

One processor in the processing component 1722 may be configured to:

determine that a target notification message is received, the target notification message containing an interference indication identifier and RB information of a target RB and the interference indication identifier being configured to indicate that the interference is from the controllable device; and reduce the interference from the controllable device over the target RB according to the target notification message.

Other implementation solutions of the present disclosure will be apparent to those skilled in the art from consideration of the specification and practice of the present disclosure. This present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for controlling interference from a controllable device, applied to a base station suffering the interference from the controllable device and comprising:

analyzing all presently received interference signals, and if each of all the presently received interference signals comprises a target interference signal, determining that the base station is suffering the interference from the controllable device, the target interference signal being an interference signal generated by the interference from the controllable device;

after it is determined that the base station is suffering the interference from the controllable device, detecting signal-to-noise ratios corresponding to all resource blocks (RBs) for data transmission, and selecting at least one RB according to a sequence from high to low signal-to-noise ratios as a target RB suffering the interference from the controllable device;

generating a target notification message, the target notification message containing an interference indication identifier and RB information of the target RB, and the interference indication identifier being configured to indicate that the interference is from the controllable device; and transmitting the target notification message to a target base station to reduce the interference from the controllable device over the target RB according to the target notification message, the target base station being a base station for providing service for the controllable device.

2. The method of claim 1, wherein transmitting the target notification message to the target base station comprises:

transmitting the target notification message to the target base station through an interface between base stations.

3. The method of claim 1, wherein transmitting the target notification message to the target base station comprises:

transmitting the target notification message to a core network to forward the target notification message to the target base station.

4. An apparatus for controlling interference from a controllable device, applied to a base station suffering the interference from the controllable device and comprising:

a processor;

a memory configured to store an instruction executable for the processor, wherein the processor is configured to:

analyze all presently received interference signals and, if each of all the presently received interference signals comprises a target interference signal, determine that the base station is suffering the interference from the controllable device, the target interference signal being an interference signal generated by the interference from the controllable device;

detect signal-to-noise ratios corresponding to all resource blocks (RBs) for data transmission and select at least one RB according to a sequence from high to low signal-to-noise ratios as a target RB suffering the interference from the controllable device;

generate a target notification message, the target notification message containing an interference indication identifier and RB information of the target RB and the interference indication identifier being configured to indicate that the interference is from the controllable device; and control a transceiver to transmit the target notification message to a target base station to reduce the interference from the controllable device over the target RB according to the target notification message, the target base station being a base station for providing service for the controllable device.

5. The apparatus of claim 4, wherein the processor is further configured to:

control the transceiver to transmit the target notification message to the target base station through an interface between base stations.

6. The apparatus of claim 4, wherein the processor is further configured to:

control the transceiver to transmit the target notification message to a core network to forward the target notification message to the target base station.

7. A non-transitory computer-readable storage medium storing a computer program that, when executed by a processor of a device, causes the device to perform:

analyzing all presently received interference signals from a controllable device, and if each of all the presently received interference signals comprises a target interference signal, determining that a base station is suffering interference from the controllable device, the target interference signal being an interference signal generated by the interference from the controllable device;

after it is determined that the base station is suffering the interference from the controllable device, detecting signal-to-noise ratios corresponding to all resource blocks (RBs) for data transmission, and selecting at least one RB according to a sequence from high to low signal-to-noise ratios as a target RB suffering the interference from the controllable device;

generating a target notification message, the target notification message containing an interference indication identifier and RB information of the target RB, and the interference indication identifier being configured to indicate that the interference is from the controllable device; and transmitting the target notification message to a target base station to reduce the interference from the controllable device over the target RB according to the target notification message, the target base station being a base station for providing service for the controllable device.

* * * * *